(12) United States Patent
Coldwate et al.

(10) Patent No.: US 9,306,432 B2
(45) Date of Patent: Apr. 5, 2016

(54) STATOR COOLING CHANNEL TOLERANT TO LOCALIZED BLOCKAGE

(71) Applicants: Joseph Kenneth Coldwate, Roscoe, IL (US); John M. Beck, Roscoe, IL (US); Debabrata Pal, Hoffman Estates, IL (US); Milan Lucic, East Windsor, CT (US)

(72) Inventors: Joseph Kenneth Coldwate, Roscoe, IL (US); John M. Beck, Roscoe, IL (US); Debabrata Pal, Hoffman Estates, IL (US); Milan Lucic, East Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 143 days.

(21) Appl. No.: 13/664,691

(22) Filed: Oct. 31, 2012

(65) Prior Publication Data
US 2014/0117798 A1    May 1, 2014

(51) Int. Cl.
*H02K 9/06* (2006.01)
*H02K 1/20* (2006.01)

(52) U.S. Cl.
CPC .. *H02K 9/06* (2013.01); *H02K 1/20* (2013.01); *H02K 2213/03* (2013.01)

(58) Field of Classification Search
CPC ....................................................... H02K 9/06
USPC ............................................... 310/52, 57–59
See application file for complete search history.

(56) References Cited

U.S. PATENT DOCUMENTS

| 2,488,365 | A | * | 11/1949 | Abbott | H02K 9/06 |
| | | | | | 310/62 |
| 2,604,501 | A | * | 7/1952 | Wightman | H02K 9/06 |
| | | | | | 310/63 |
| 3,800,173 | A | * | 3/1974 | Rosenberry, Jr. | H02K 9/06 |
| | | | | | 310/59 |
| 4,684,837 | A | * | 8/1987 | Schaefer et al. | 310/87 |
| 4,766,337 | A | * | 8/1988 | Parkinson et al. | 310/58 |
| 5,698,913 | A | * | 12/1997 | Yagi et al. | 310/58 |
| 5,789,833 | A | * | 8/1998 | Kinoshita et al. | 310/64 |
| 5,925,947 | A | * | 7/1999 | Kajiwara et al. | 310/64 |
| 5,982,071 | A | * | 11/1999 | Ehrick | 310/216.056 |
| 6,849,974 | B2 | * | 2/2005 | Howe et al. | 310/89 |
| 7,164,218 | B2 | * | 1/2007 | Kimura et al. | 310/216.044 |
| 7,541,701 | B2 | * | 6/2009 | Lin et al. | 310/58 |
| 8,053,938 | B2 | * | 11/2011 | Pal et al. | 310/52 |
| 2010/0207465 | A1 | | 8/2010 | Dutau et al. | |

* cited by examiner

*Primary Examiner* — Dang Le
(74) *Attorney, Agent, or Firm* — Cantor Colburn LLP

(57) ABSTRACT

A motor is provided including a stator core having a plurality of stator fins projecting outwardly from the stator core. A plurality of stator cooling channels is defined between adjacent stator fins. A flow mixer ring is axially aligned with the stator core and separated therefrom by an axial gap. The flow mixer ring includes a plurality of ring fins projecting inwardly from an interior surface and a plurality of ring cooling channels defined between the plurality of ring fins. The plurality of ring fins extends from a first surface over at least a portion of an axial length of the flow mixer ring.

14 Claims, 5 Drawing Sheets

FIG. 3
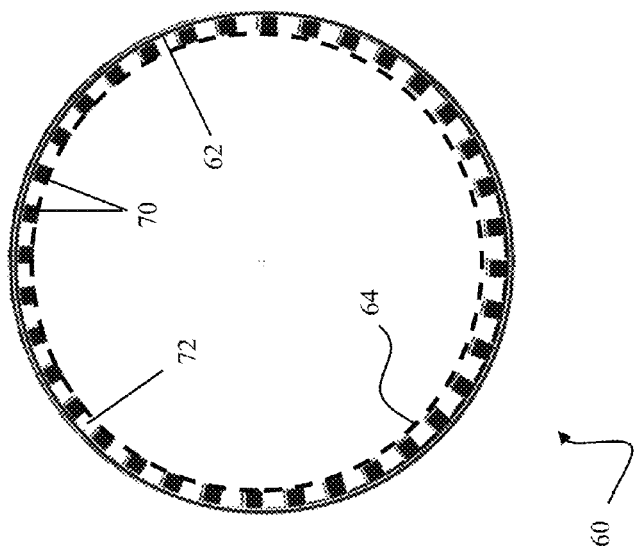
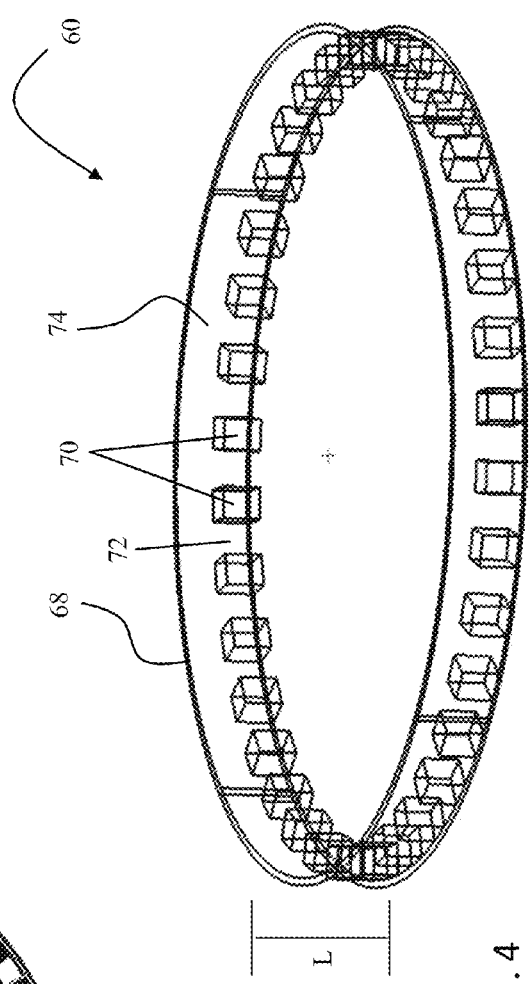
FIG. 4

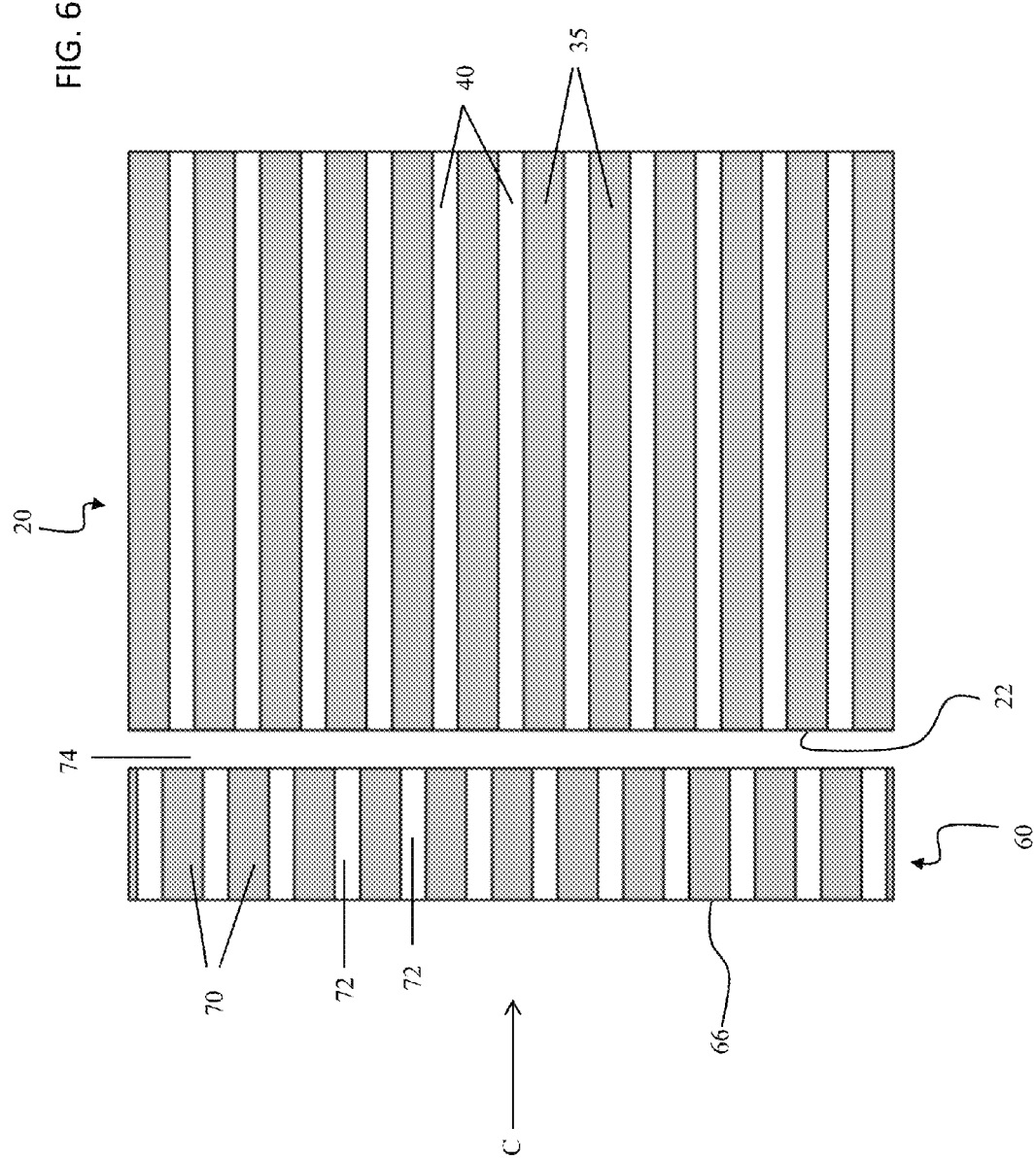

STATOR COOLING CHANNEL TOLERANT TO LOCALIZED BLOCKAGE

BACKGROUND OF THE INVENTION

Exemplary embodiments of this invention generally relate to electrical machines and, more particularly, to a stator structure of an electrical machine for improved cooling.

A stator core generates a considerable amount of heat during operation. It is important to remove this heat because overheating of the stator will reduce the life and performance of motors and generators, thereby limiting the range of applications in which they may be used. Conventional stators include a plurality of fins disposed around the outside circumference of the stator. A cooling fluid, such as air, oil, or another coolant for example, will flow through the cooling channels created between adjacent fins to remove heat from the stator through convection.

In some applications, foreign material from the environment, such as dirt and debris, will enter the stator assembly. This foreign material may become lodged in the stator assembly so as to form a blockage in one or more cooling channels. The blockage impedes the flow of the cooling fluid to a portion of the stator, such that heat from that area of the stator is not efficiently removed. Occurrence of such blockages cause the temperature of the stator to rise and can ultimately lead to a winding failure.

BRIEF DESCRIPTION OF THE INVENTION

According to one embodiment of the invention, a flow mixer ring for use in a motor is provided including a generally circular body constructed from a thermally conductive material. A plurality of fins projects inwardly from an outer surface of the body. A plurality of cooling channels is defined between the plurality of fins. The plurality of fins extends from a first surface over at least a portion of an axial length of the flow mixer ring.

According to an alternate embodiment of the invention, a motor is provided including a stator core having a plurality of stator fins projecting outwardly from the stator core. A plurality of stator cooling channels is defined between adjacent stator fins. A flow mixer ring is axially aligned with the stator core and separated therefrom by an axial gap. The flow mixer ring includes a plurality of ring fins projecting inwardly from an outer surface and a plurality of ring cooling channels defined between the plurality of ring fins. The plurality of ring fins extends from a first surface over at least a portion of an axial length of the flow mixer ring.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 3 is a front view of a flow mixer ring according to an embodiment of the invention;

FIG. 4 is a perspective view of a flow mixer ring according to an embodiment of the invention;

FIG. 6 is a top view of a flow mixer ring and stator core according to an embodiment of the invention.

The detailed description explains embodiments of the invention, together with advantages and features, by way of example with reference to the drawings.

DETAILED DESCRIPTION OF THE INVENTION

Figure 1:
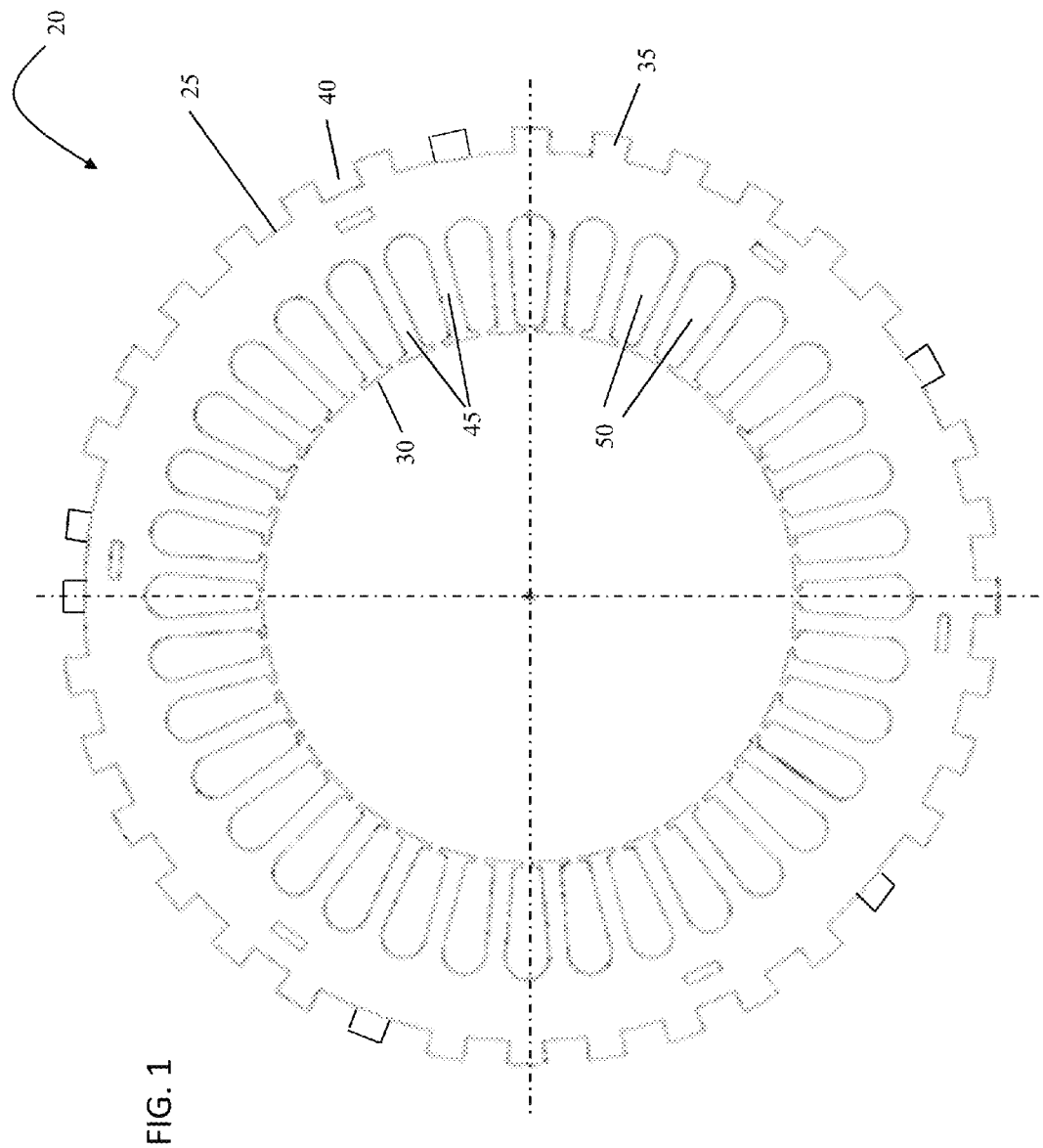
FIG. 1 is a front view of a stator core according to an embodiment of the invention.
Figure 2:
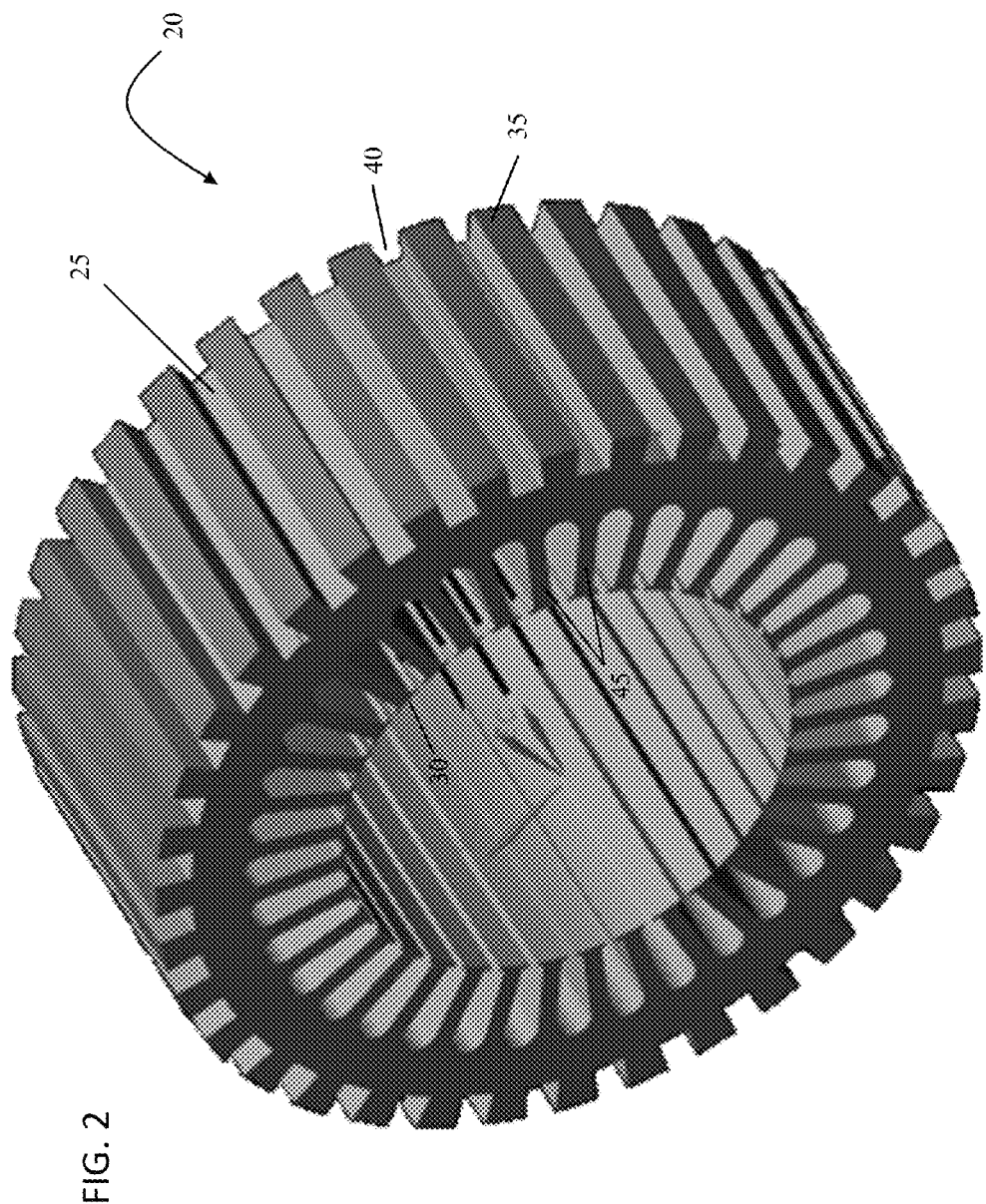
FIG. 2 is a perspective view of a stator core according to an embodiment of the invention.

Referring now to FIGS. 1 and 2, a generally circular stator core 20 of an electrical machine or motor is illustrated. The stator core 20 may be made from iron or any other conventionally used material. The stator core 20 includes a plurality of substantially identical and outwardly projecting fins 35, located around the outside diameter 25 thereof. The fins 35 define an outer periphery of the stator 20. In one embodiment, the fins 35 are uniform in size. A plurality of cooling channels 40 are created between adjacent fins 35 such that a cooling fluid, such as air for example, may flow through the cooling channels 40 to remove heat from the stator core 20. The stator core 20 also includes a plurality of inwardly projecting teeth 45 that define an inner periphery 30 of the stator core 20. The teeth 45 also provide winding spaces 50 that receive the stator windings (not shown) of the stator core 20.

Figure 5:
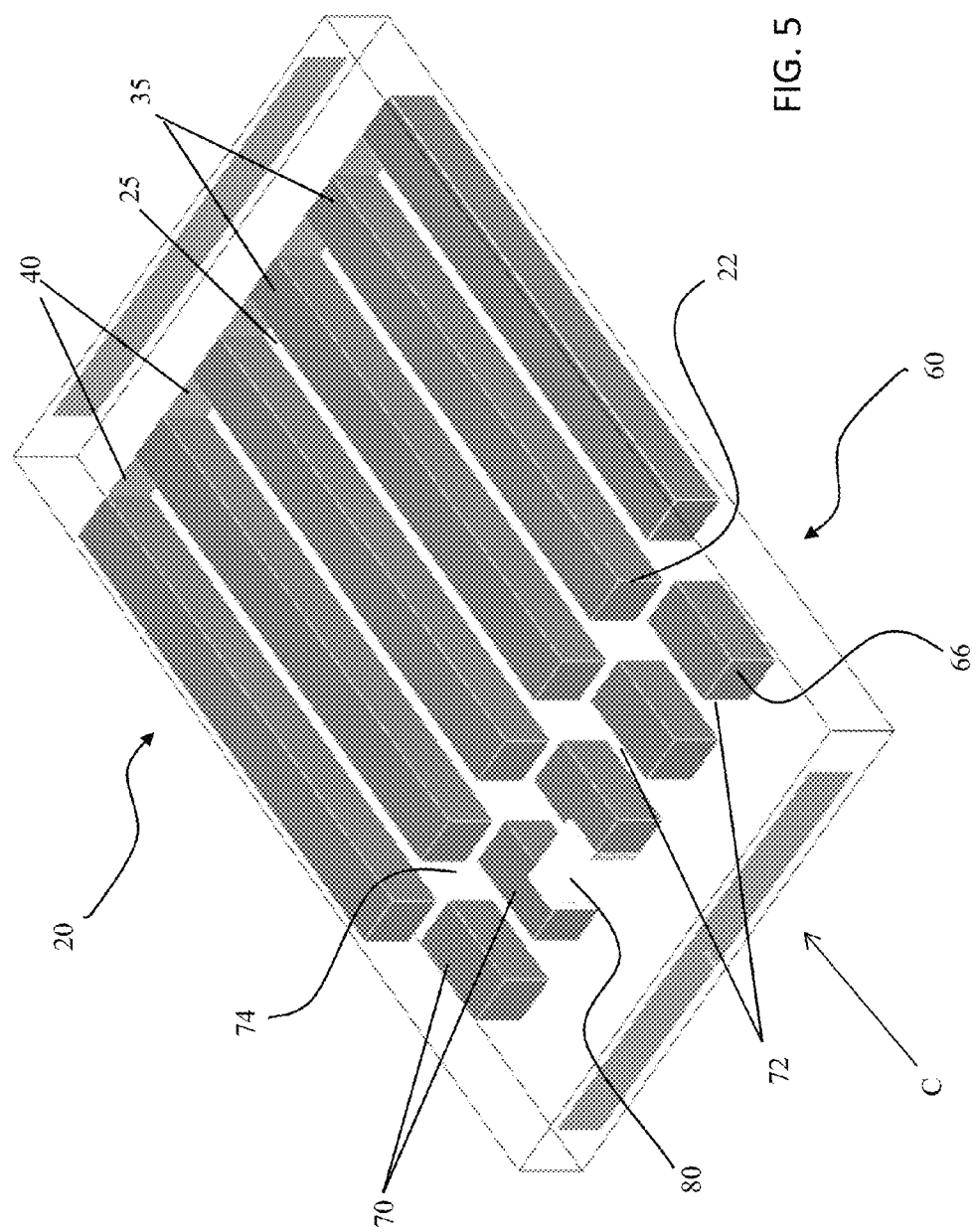
FIG. 5 is a perspective view of the flow mixer ring aligned with the stator core according to an embodiment of the invention.

As is known in the art, electrical machines typically include a rotor disposed within a stator. The stator is cooled by airflow through the electrical machine. According to one embodiment, an electrical machine includes a flow mixer ring, such as flow mixer ring 60, as illustrated in FIGS. 3-5. The flow mixer ring 60 has a generally circular body and includes a plurality of similar fins 70 that protrude toward the interior of the ring 60 from an interior surface 62 of the flow mixer ring 60, and cooling channels 72 are defined between pairs of adjacent fins 70. In one embodiment, the fins 70 and cooling channels 72 of the flow mixer ring 60 are substantially similar in shape and size to the fins 35 and cooling channels 40 of the stator core 20. Alternatively, the fins 70 and cooling channels 72 may be a different size and/or shape than the fins 35 and cooling channels 40 of the stator core 20. As illustrated in FIGS. 3 and 4, the fins 70 may protrude inwardly from the interior surface 62 of the flow mixer ring 60. In such embodiments, the interior surface 62 has a diameter substantially equal to the outer periphery defined by the fins 35 of the stator core 20. The inwardly projecting fins 70 define an inner periphery 64 of the flow mixer ring 60. In one embodiment, the inner periphery 64 of the flow mixer ring 60 has a diameter about equal to the outer diameter 25 of the stator core 20.

The flow mixer ring 60 has a limited axial length L relative to the length of the stator core 20 and is made from a thermally conductive material, for example a metal. In one embodiment, the axial length L of the flow mixer ring 60 is in the range of about 0.06 inches (0.1524 centimeters) to about 0.1 inches (0.254 centimeters). The flow mixer ring 60 may be manufactured from a piece of sheet metal, such as with a stamping or punching process. Alternatively, the flow mixer ring 60 may be formed from a washer by removing material from the inner periphery 64 of the washer to create the plurality of fins 70 and cooling channels 72.

Referring now to FIGS. 5 and 6, in operation, the flow mixer ring 60 is positioned upstream from the stator core 20 in a housing (not shown) such that the cooling fluid, flowing in the direction indicated by arrow C, first passes through the cooling channels 72 of the flow mixer ring 60 before entering the cooling channels 40 of the stator core 20. The flow mixer ring 60 is arranged adjacent the stator core 20 such that an axial gap 74 separates the flow mixer ring 60 and a first end 22 of the stator core 20. The flow mixer ring 60 may be retained in a desired position, adjacent the stator core 20, using a snap ring or retainer ring for example. The axial gap 74 has, in one embodiment, a distance in the range of about 0.2 inches (0.508 centimeters) to about 0.5 inches (1.27 centimeters). In another embodiment, the axial gap 74 is integrally formed into the flow mixer ring 60 (see FIG. 4). In such alternative embodiments, the axial length L of the flow mixer ring 60 is increased, and the fins 70 extend from adjacent a front surface 66 of the flow mixer ring 60 over only a portion of the axial length L. In such instances, the axial gap 74 is positioned between a back surface 68 of the flow mixer ring 60 and the plurality of fins 70.

In operation, the flow mixer ring 60 is positioned adjacent the stator core 20 such that the plurality of fins 70 and cooling channels 72 of the flow mixer ring 60 are offset from the fins 35 and cooling channels 40 of the stator core 20. In one embodiment, the flow mixer ring 60 is rotated about half the width of a fin 70 such that a portion of each fin 70 overlaps with a fin 35 of the stator core 20 and a portion of each fin 70 overlaps with an adjacent cooling channel 40 of the stator core 20. This rotation of the flow mixer ring 60 relative to the stator core 20 ensures that the cooling fluid entering the cooling channels 40 of the stator core 20 have a turbulent flow.

By positioning the flow mixer ring 60 upstream from the stator core 20, the flow mixer ring 60 acts as a screen to prevent foreign material from entering the cooling channels 40 of the stator core 20 and forming a blockage 80 (see FIG. 5). After circumventing a blockage, the cooling fluid will disperse from the axial gap between the flow mixer ring and the stator core 20 to all cooling channels 40 of the state core 20. The axial gap 74 allows the cooling fluid to flow to neighboring channels, thereby preventing the stator core 20 from overheating, even in the event of a blocked channel 80. In addition, the flow mixer ring 60 may be warmed by the operation of the motor. As a result, the flow mixer ring 60 may be considered self-cleaning with respect to some blockages, such as those formed by ice and fog for example.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while the various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A flow mixer ring for use in a motor comprising:
a generally circular body constructed from a thermally conductive material;
a plurality of fins arranged about a circumference of and projecting inwardly from an inner surface of the body, the plurality of fins being arranged adjacent only a first end of the circular body;
a plurality of cooling channels defined between the plurality of fins; wherein an inner diameter defined by the plurality of fins is substantially equal to a diameter of an adjacent component of the motor, the plurality of fins are stationary and are configured to block an airflow through at least one cooling channel of an adjacent stator core when installed in the motor.

2. The flow mixer ring according to claim 1, wherein the axial length of the flow mixer ring is in the range of about 0.06 inches and 0.1 inches.

3. The flow mixer ring according to claim 1, wherein the flow mixer ring is formed from a washer.

4. The flow mixer ring according to claim 1, wherein the flow mixer ring is formed from a piece of sheet metal.

5. A motor comprising:
a stator core including a plurality of stator fins projecting outwardly from an outer surface of the stator core and a plurality of stator cooling channels defined between adjacent stator fins;
a stationary flow mixer ring axially aligned with the stator core, and separated therefrom by an axial gap, the flow mixer ring including a plurality of ring fins projecting inwardly from an interior surface and a plurality of ring cooling channels defined between the plurality of ring fins, wherein an inner diameter defined by the plurality of ring fins is substantially equal to a diameter of the outer surface of the stator core, and wherein the plurality of ring fins extends from the first surface adjacent a first edge of the flow mixer ring over at least a portion of an axial length of the flow mixer ring.

6. The motor according to claim 5, wherein the plurality of ring fins project inwardly from an interior surface of the body.

7. The motor according to claim 5, wherein the axial length of the flow mixer ring is in the range of about 0.06 inches and 0.1 inches.

8. The motor according to claim 5, wherein the plurality of ring fins and the plurality of stator fins are substantially similar in shape and size.

9. The motor according to claim 5, wherein the plurality of ring fins are radially offset from the plurality of stator fins.

10. The motor according to claim 9, wherein the plurality of ring fins are radially offset from the plurality of stator fins by a distance of about half a width of a ring fin.

11. The motor according to claim 5, wherein the axial gap is in the range of about 0.25 inches to about 0.5 inches.

12. The motor according to claim 5, wherein the axial gap is formed integrally with the flow mixer ring such that the plurality of ring fins extend over only a portion of the axial length and the axial gap extends between a back surface of the flow mixer ring and the plurality of ring fins.

13. The motor according to claim 5, wherein the flow mixer ring is thermally conductive.

14. The motor according to claim 13, wherein the flow mixing ring is self-cleaning.

* * * * *